United States Patent [19]

Sasaki et al.

[11] Patent Number: 5,151,973
[45] Date of Patent: Sep. 29, 1992

[54] PRINTING APPARATUS AND INFORMATION PROCESSING APPARATUS USING THE SAME

[75] Inventors: Akira Sasaki; Takeshi Kato; Akiyoshi Hakoyama, all of Hitachi, Japan

[73] Assignee: Hitachi, Ltd., Tokyo, Japan

[21] Appl. No.: 701,042

[22] Filed: May 16, 1991

[30] Foreign Application Priority Data

May 18, 1990 [JP] Japan .................. 2-126720

[51] Int. Cl.$^5$ ........................................... G06K 15/00
[52] U.S. Cl. ..................................... 395/109; 395/106
[58] Field of Search ............... 395/109, 112, 115, 101, 395/106; 358/296, 298, 300, 455, 456, 457, 458–461; 346/154, 157

[56] References Cited

U.S. PATENT DOCUMENTS 4,491,875  1/1985  Kawamura .......................... 358/298
4,516,135  5/1985  Todoh .................................. 358/298

Primary Examiner—Arthur G. Evans
Attorney, Agent, or Firm—Antonelli, Terry, Stout & Kraus

[57] ABSTRACT

A main control unit for controlling a dot printing element in a laser beam printer has a first control means for controlling the dot printing element so as to print a predetermined dot size in accordance with an existence of a dot signal in an image information signal. The main control unit has a second control means and a control selection means. The second control means controls the dot printing element so as to vary a size of the dot of a dither matrix. The control selection means operates selectively the first control means and the second control means. A gradation data is transmitted to the printer without conversion of a dither matrix data. The printer can print an image in response to in either cases of a character pattern dot data signal and a gradation data signal. The printer has a gradation signal on an interference, a gradation converting means and a laser modulating means. The printer can connect in either cases of an existence state and a non-existence state of the gradation signal.

19 Claims, 8 Drawing Sheets

FIG. 6
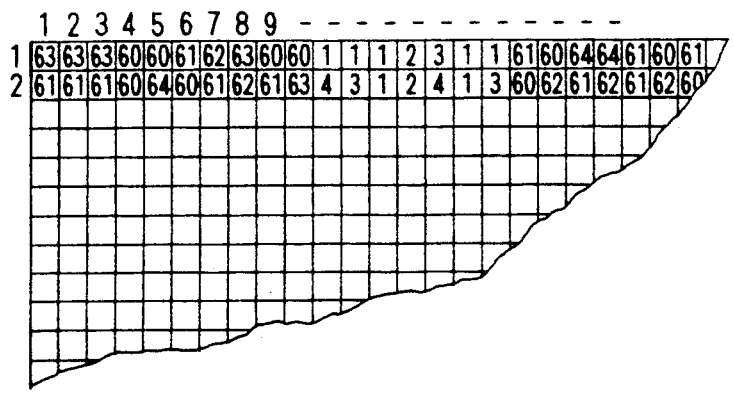
FIG. 7
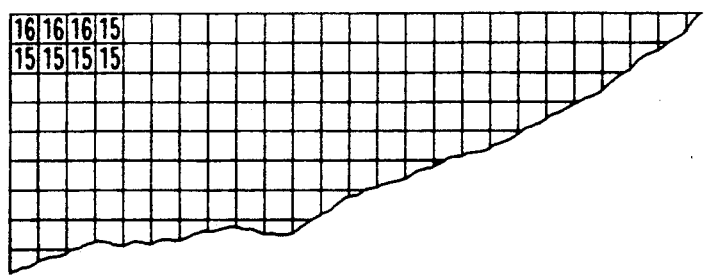
FIG. 8

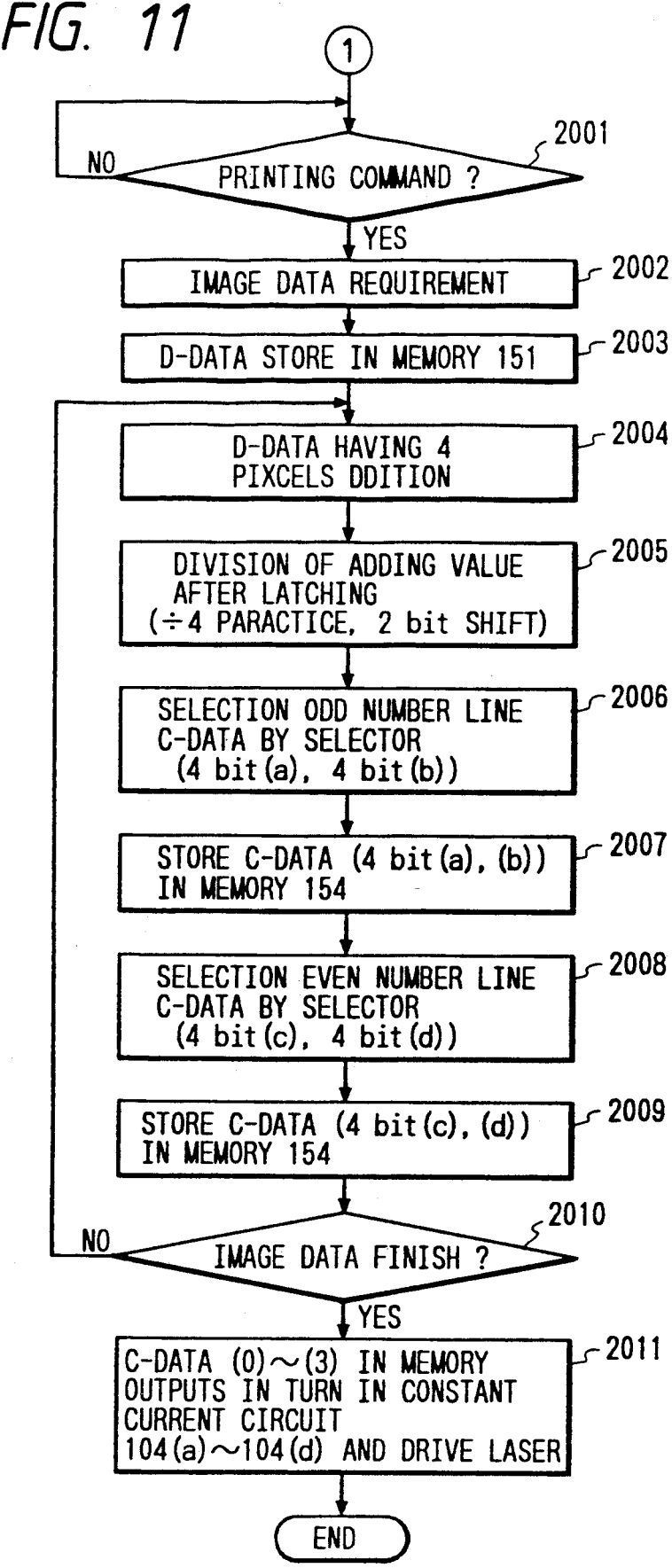

PRINTING APPARATUS AND INFORMATION PROCESSING APPARATUS USING THE SAME

BACKGROUND OF THE INVENTION

The present invention relates a printing apparatus and an information processing apparatus using the printing apparatus and, more particularly to a printing apparatus and an information processing apparatus such as DTP (Disc Top Publishing), CAD (Computer Aided Design), EP (ElectroPhoto Publishing) and a photo-filing apparatus using the printing apparatus.

In the present invention, the printing apparatus such as LBP (Laser Beam Printer) controls a dot printing element in accordance with an image information signal and forms a visual image which is expressed using dots. The laser beam printer comprises a main control circuit for controlling the dot printing element which is transmitted from an image information signal generating unit.

The image information signal generating unit employs an image data read-out apparatus for generating a gradation data signal of an image to be printed, a personal computer and a word processor for generating a character pattern dot signal and an image information signal generating unit being combined the above stated apparatuses together with. The image information signal generating unit outputs a gradation information signal and in accordance with an inputted gradation information signal a printing dot size control and a dither matrix control are carried out, respectively.

In the image data for printing the image in the conventional printing apparatus for use in this kind of the information processing apparatus, in a case that a picture expressing a gradation is printed, the image data is converted to a dither matrix data at a side of an image information signal generating unit and a dot signal which has been converted as a two-valued logic is given at a side of the printing apparatus.

The dither matrix used generally for the gradation expression is rough as the image, for example so as to express 64 stage gradations even the expression of a half tone comprises 64 gradations because a dot matrix having 8×8 is expressed as one unit. Further in a case that the gradation expression such as 128 stage gradations and 256 stage gradations is intended to express, the image becomes more roughly because the size of the picture element or the expression size of photograph becomes large.

Besides, for expressing the above stated gradations, for example in a case that 64 stage gradations are expressed by varying the size of the dot constituting the image, there are many technical problems for obtaining the good reproduction in the dot size.

For solving the above stated various technical problems, the printing apparatus is disclosed in Japanese Patent Laid-Open No. 61566/1986, for example. In this conventional printing apparatus, the gradation information signal is inputted through the image information signal generating unit and in accordance with the gradation information signal both the printing dot size control and the dither matrix control are carried out.

It is desirable to connect the printing apparatus to the various kind of the image information signal generating units and to print the various kinds of the image data which are given through the image information signal generating units. However, there has been not paid an attention about the above stated consideration in the conventional printing apparatus.

SUMMARY OF THE INVENTION

An object of the present invention is to provide a printing apparatus and an information processing apparatus using the same wherein a high precise image data can be printed.

Another object of the present invention is to provide a printing apparatus and an information processing apparatus using the same wherein by using together a printing dot size control and a dither matrix control and by reducing a lowering in a resolution degree of a gradation data, an image data having a high precise quality can be printed.

A further object of the present invention is to provide a printing apparatus and an information processing apparatus using the same wherein an image data which is given through various kinds of image information signal generating units can be printed with a high precise quality.

A further object of the present invention is to provide a printing apparatus and an information processing apparatus using the same wherein in either cases of a character dot data and a gradation data for expressing a density of a picture, each of which is generated through an image information signal generating unit, an image data having a high precise quality can be printed.

In accordance with the present invention, in a printing apparatus in which a dot printing element is controlled in accordance with an image information signal transmitted from an image information signal generating unit and a visual image expressed by dots is formed, the dot printing element is controlled through a main control unit, the main control unit comprises a first control means, the first control means of the main control unit controls the dot printing element so as to print a dot having a predetermined dot size in accordance with an existence of a dot signal in the image information signal, the printing apparatus characterized in that, the main control unit includes further a second control means and a control selection means, the second control means of the main control unit controls the dot printing element so as to vary a size of the dot of a dither dot matrix which is expressed in accordance with a gradation signal of the image information signal, and the control selection means of the main control unit operates selectively the first control means of the main control unit and the second control means of the main control unit.

In accordance with the present invention, in an information processing apparatus using a printing apparatus comprising an image information signal generating unit having an image read out means for generating a gradation information signal and a character pattern information generating means for generating a character pattern information signal, the printing apparatus in which a dot printing element is controlled in accordance with an image information signal transmitted from the image information signal generating unit and a visual image expressed by dots is formed, the image information signal generating unit includes a transmitting means for transmitting the gradation information signal and the character pattern information signal, the printing apparatus includes a main control unit for controlling the dot printing element, the first control means of the main control unit controls the dot printing element so as to print a dot having a predetermined dot size in accordance with an existence of a dot signal in the image information signal, the information processing apparatus characterized in that, the main control unit of the printing apparatus includes further a second control means, a control selection means, and a data identifying signal generating means, the second control means of the main control unit in the printing apparatus controls the dot printing element so as to vary a size of the dot of a dither dot matrix which is expressed in accordance with a gradation signal of the image information signal, and the control selection means of the main control unit in the printing apparatus operates selectively the first control means of the main control unit and the second control means of the main control unit in accordance with an identifying signal through the data identifying signal generating means of the main control unit.

In the present invention, the gradation data signal indicates a density level at every dot when the gradation data signal is printed by the printing apparatus. This gradation data signal is an original information of the image in which the image information signal generating unit makes to print by the printing apparatus.

Besides, in the conventional printing apparatus, the image information signal generating unit converts the gradation data to the dither matrix data and after that the dither matrix data is transmitted to the printing apparatus. However, in the present invention, the gradation data is not convert to the dither matrix data but is transmitted directly to the printing apparatus as it is.

In the present invention, in the main control unit for controlling the dot printing element, the energy amount applied to the dot printing element is controlled by the size of the duty current and the length of the duty current time. The first control means of the main control unit controls and prints the dot by controlling the dot printing element in accordance with the existence of the dot data signal which is transmitted through the image information signal generating unit. The second control means of the main control unit controls the dot printing element and prints the dot in accordance with the gradation data signal which is transmitted through the image information signal generating unit and by varying the dot size of the dither matrix data.

Therefore, in the printing apparatus according to the present invention, the image printing is carried out by responding in either cases of the character pattern dot signal which indicates the existence of the dot to be printed and the gradation data signal of the image to be printed.

In accordance with the invention, the gradation data is transmitted to the printing apparatus without conversion of the dither matrix data. The printing apparatus can print the image in response to in either cases of the character pattern dot data signal and the gradation data signal. The printing apparatus has the gradation signal on the interference, the gradation converting means and the modulating means. The printing apparatus can connect in either cases of the existence state and the non-existence state of the gradation signal in the host machine.

According to the present invention, since the printing apparatus can be printed in either cases of the character dot data and the gradation data for expressing the density of the picture, each of which is generated through the image information signal generating unit, thereby the information processing apparatus using the printing apparatus and having the general purpose characteristic can be obtained.

Further, by using together the printing dot size control and the dither matrix control and by reducing the lowering in the resolution degree of the gradation data, the high precise image data can be printed.

BRIEF DESCRIPTION OF THE DRAWINGS

FIG. 6 is a gradation data stored in a memory in the image information signal generating unit of the information processing apparatus;

FIG. 7 is a matrix data stored in a memory in the image information signal generating unit of the information processing apparatus;

FIG. 8 is a matrix data stored in a dither matrix ROM in a gradation converting circuit of the information processing apparatus;

FIG. 11 is a flow chart of a data processing being carried out by CPU in the controller of the information processing apparatus during a printing of a gradation data.

DESCRIPTION OF THE INVENTION

One embodiment of an information processing apparatus having a printing apparatus according to the present invention will be explained referring to drawings.

Figure 12:
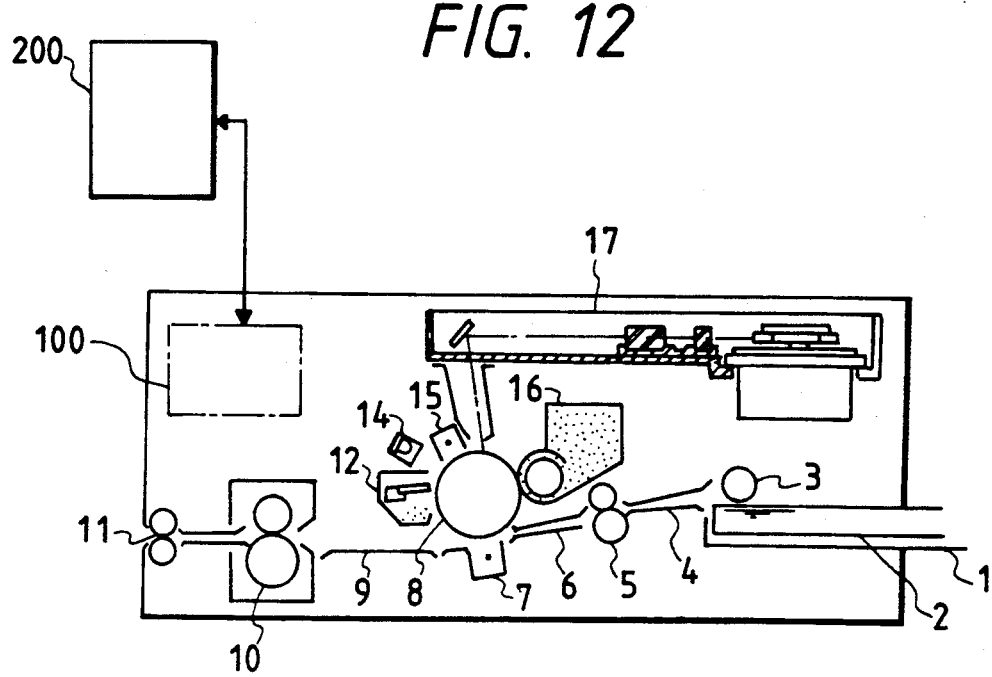
FIG. 12 is a schematic structure showing the information processing apparatus having a laser beam printer.

First of all, FIG. 12 shows an information processing apparatus on which a laser beam printer is installed as a printing apparatus. This laser beam printer is exemplified as one embodiment of a printing apparatus according to the present invention.

In FIG. 12, a paper receiving cassette 1 receives a plural of papers 2 therein. The paper 2 is extracted from the paper receiving cassette 1 and fed toward a front paper sending direction through a paper supplying roller 3. The paper 2 is transported toward a resist roller 5 through a paper sending guide 4.

An image data from an image information signal generating unit 200 is received in a controller 100. The controller 100 carries out a printing process time management so as to position a writing-out position of a tip end of the paper 2 at a predetermined position and after that the controller 100 performs to rotate the resist roller 5.

By passing an erasing process through an erasing lamp 14, an electro-static charging process through an electro-static charging unit 15, a scanning exposure processing through a laser exposuring unit 17 and a developing process through a developing unit 16, then a toner image is formed on an outer peripheral surface of a photo-sensitive drum 8.

The toner image is reached to a transferring unit 7 portion and opposed against the paper 2 which has been transported on the paper sending guide 6 through the resist roller 5. At this portion, the toner image is given a transferring electric field by the transferring unit 7 and the toner image on the photo-sensitive drum 8 is transferred against the paper 2.

After that, the paper 2 is transported on a paper sending guide 9 and is fixed through a fixing unit 10 and the paper 2 is discharged through a paper discharging roller 11 outside portion. The toner being left on the photo-sensitive drum 8 after the fixing process through the transferring unit 7 is recovered by a cleaner 12.

Each of the paper sending roller 3, the resist roller 5, the fixing unit 10, the paper discharging roller 11, the erasing lamp 14, the electro-static charging unit 15, and the developing unit 16 and the laser exposuring unit 17 is controlled by the controller 100, respectively.

Figure 1:
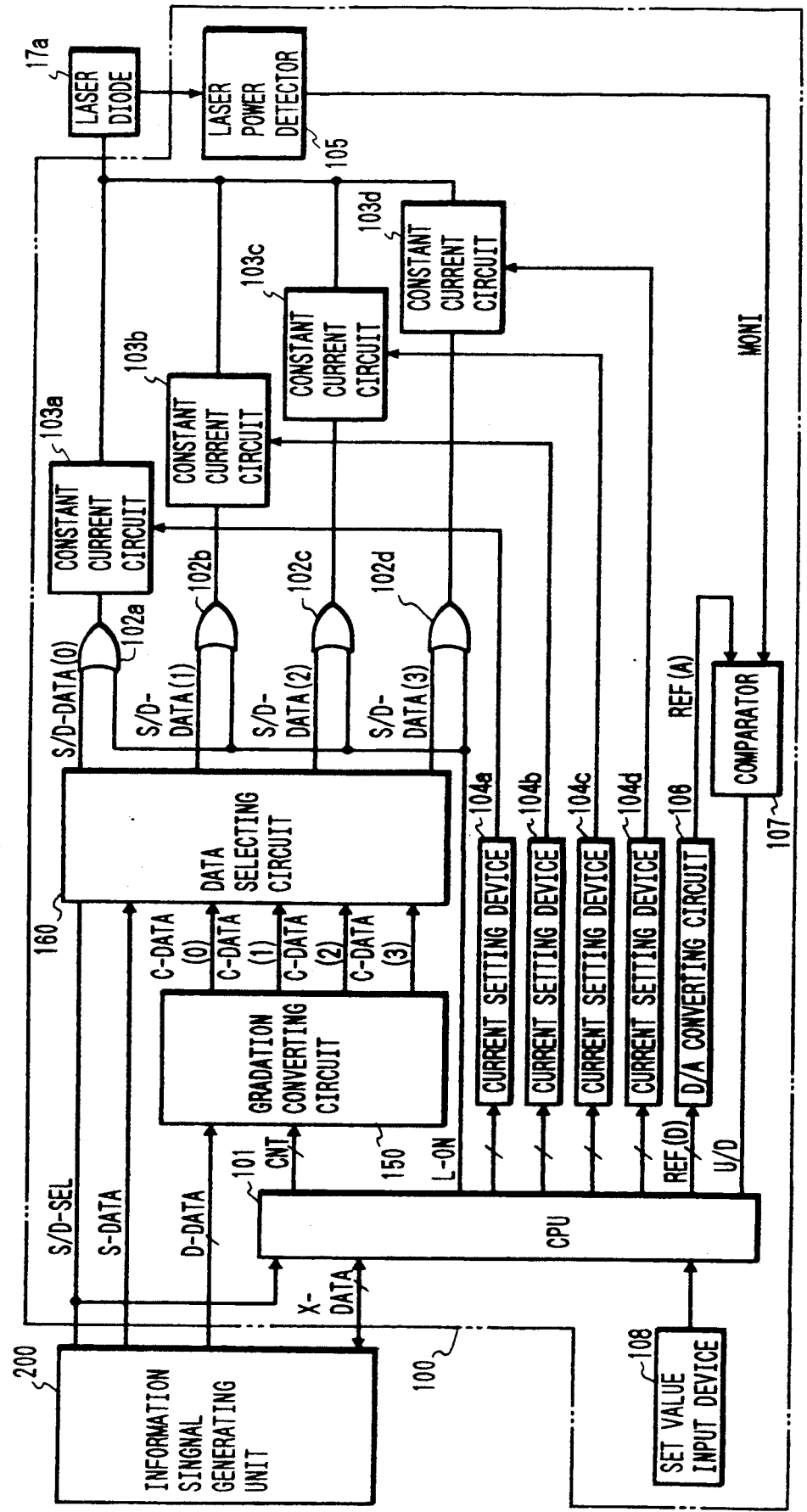
FIG. 1 is a block diagram showing one embodiment of a main control circuit of an information processing apparatus using a printing apparatus according to the present invention.

FIG. 1 is a block diagram showing a main control circuit of the information processing apparatus.

Figure 2:
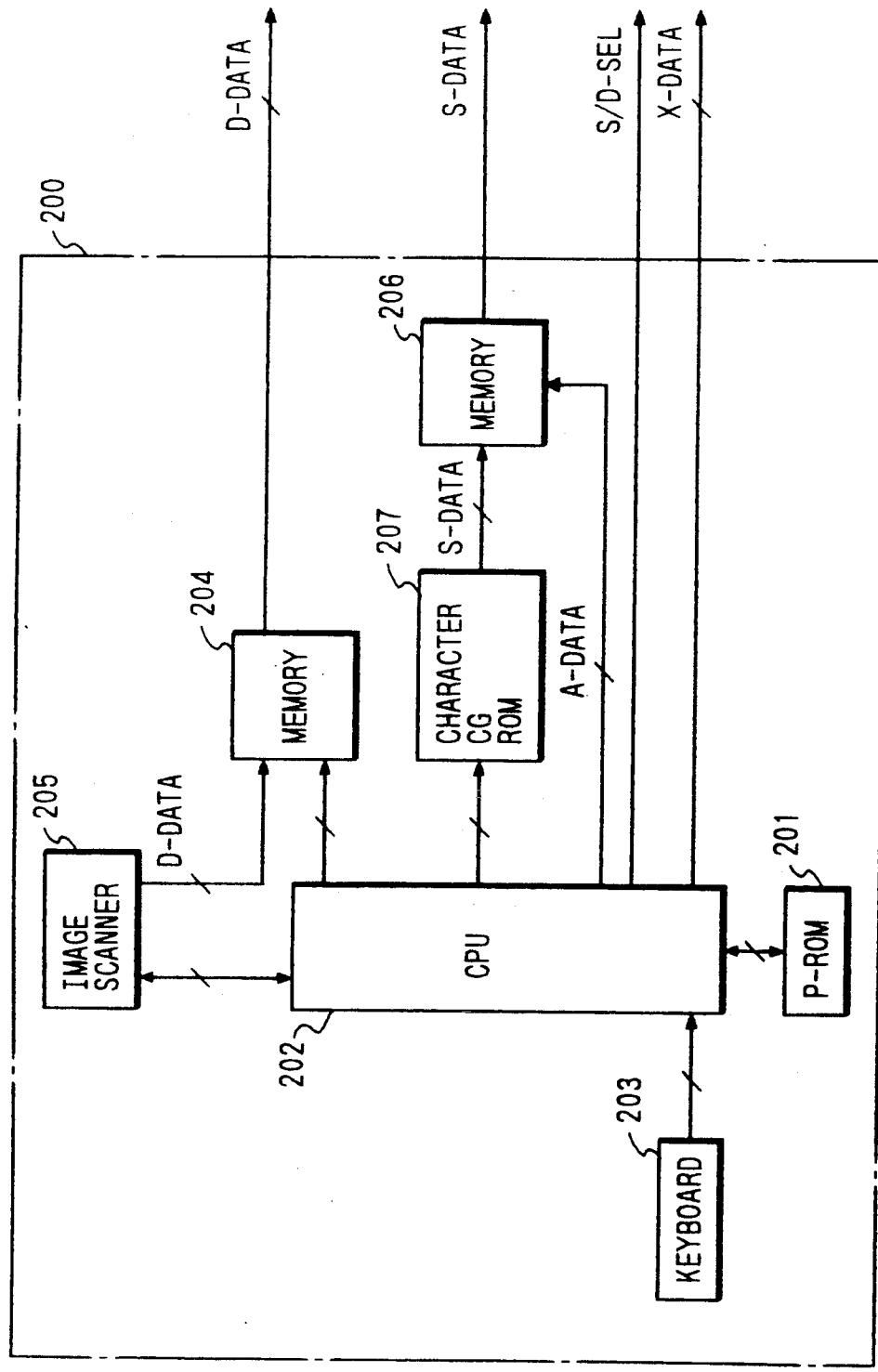
FIG. 2 is a block diagram showing a main control circuit of an image information signal generating unit of the information processing apparatus.

The information processing apparatus includes the image information signal generating unit 200. As shown in FIG. 2, the image information signal generating unit 200 comprises CPU 202, a keyboard 203, an image scanner 205 and a character CG-ROM 207. The details of each of the above elements of the image information signal generating unit 200 are as follows.

Namely, CPU 202 practises a data processing and a controlling processing according to programming housed in P-ROM 201. The keyboard 203 gives a controlling function and a character data to CPU 202. The image scanner 205 generates a gradation data D-DATA by reading out or converting by a photo-electric processing a picture under the control of CPU 202 and stores the gradation data D-DATA in a memory 204.

The character CG-ROM 207 converts a character code which is indicated to input by the keyboard 203 to a character pattern dot data S-DATA and stores the character pattern dot data S-DATA at a predetermined position of a memory 206. The predetermined position in the memory 206 is indicated by an address data A-DATA which is given through CPU 202.

For the sake of convenience in an explanation of this embodiment according to the present invention, herein, it assumes that the image scanner 205 decomposes a density of the picture at sixty four (64) stage gradations and reads out, and this image scanner 205 has a performance for making a digital data.

The gradation data D-DATA (6 bit/1 pixel) indicates a density at every unit area (hereinafter calls a pixel) corresponding to line densities (DPI) of the image scanner 205 and the laser beam printer. The gradation data D-DATA is outputted in sequence from the image scanner 205 and is stored in sequence in the memory 204. Herein, the character pattern dot data S-DATA is a data having 1 bit/1 pixel.

When CPU 202 reads out a data stored in the memory 204 and the memory 206 and generates the gradation data D-DATA or the character pattern dot data S-DATA, this CPU 202 receives a selection data S/D SEL and a control data X-DATA. The selection data S/D SEL is a data for indicating whether which data being an effective image data for printing and the control data X-DATA carries out a timing control and others.

Namely, the selection data S/D SEL is made the laser beam printer to discriminate that the image data for printing generated in the image information signal generating unit 200 is whether the gradation data D-DATA for indicating the density of the pixel of the picture or the character pattern dot data S-DATA for indicating the existence of the character pattern dot.

The controller 100 of the laser beam printer comprises a gradation converting circuit 150. This gradation converting circuit 150 converts a laser modulation data C-DATA to the above gradation data D-DATA under the control through a control signal CNT for generating CPU 202 of the above image information signal generating unit 200 and CPU 101. CPU 101 works in cooperation with the above selection data S/D-SEL and the control data X-DATA by receiving them.

Figure 3:
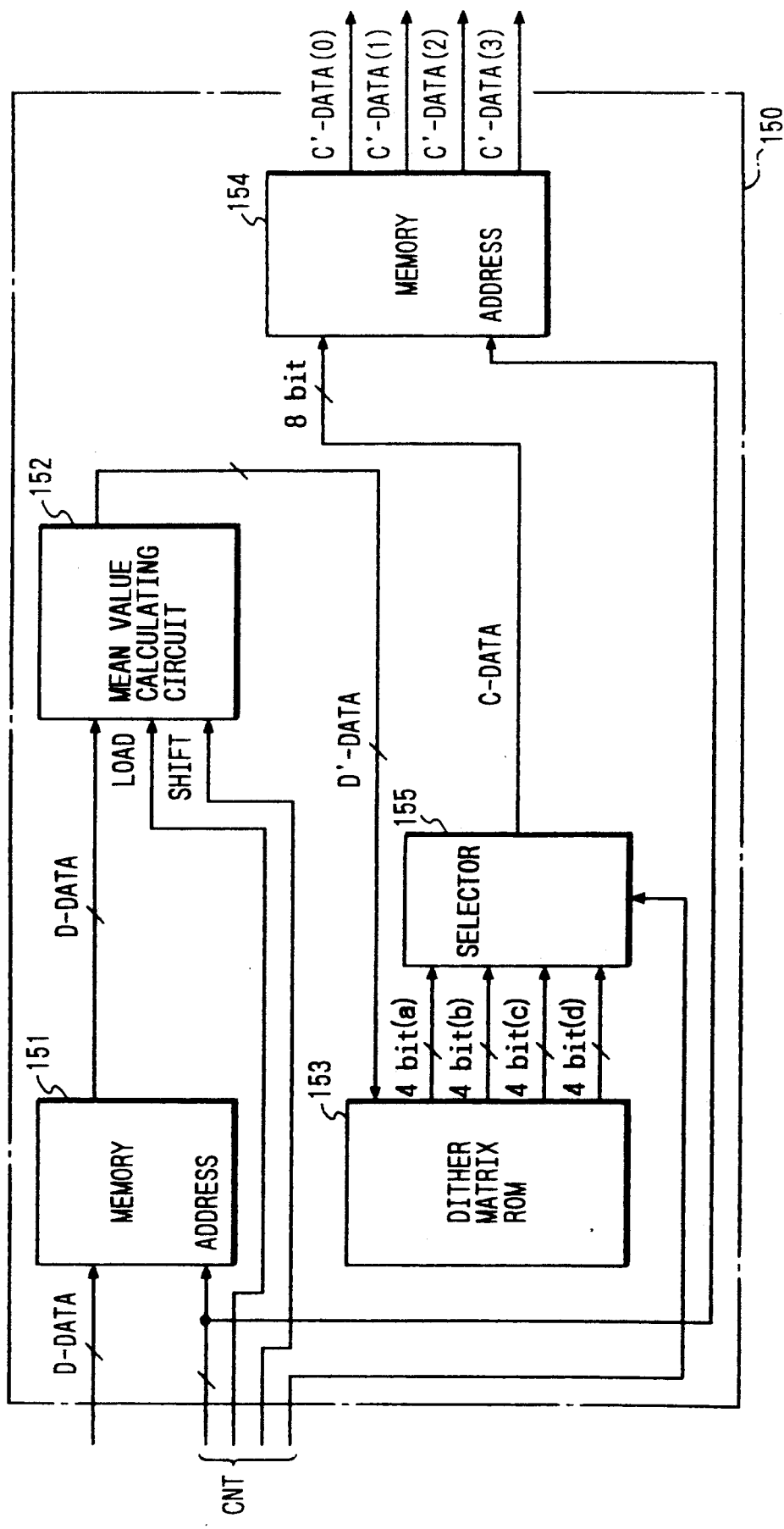
FIG. 3 is a circuitry showing a gradation converting circuit of a controller in the information processing apparatus.

The gradation converting circuit 150 comprises a memory 151 for storing the gradation data D-DATA being transmitted from the above image information signal generating unit 200, as shown in FIG. 3.

FIG. 6 shows the gradation data D-DATA stored in the memory 151. In this figure, one box indicates one pixel part and the numeral in the box shows the gradation data D-DATA in such one pixel. This gradation data D-DATA shows a condition in which the gradation data D-DATA is stored in sequence the order of the data given from the image information signal generating unit 200. Namely, it is stored in order of "63"-"63"-"63"-"60"-"60"-"61"-"62".

When the receipt and the memory of the gradation data D-DATA for one line part are finished, the receipt and the memory of the gradation data D-DATA for next one line part are carried out in succession.

In this embodiment of the present invention, so as to make the density of the printing picture image having sixty four (64) stage gradations, the following method is employed. Namely, sixteen (16) stage gradations are expressed according to the size variation of the printing picture image and four (4) stage gradations are expressed according to the variation of the dither matrix. For obtain the control data for carrying out the above expression method, the gradation data D-DATA for at least two line parts is stored in the memory 151 and this gradation data D-DATA is transmitted to a mean value calculating circuit 152.

Figure 4:
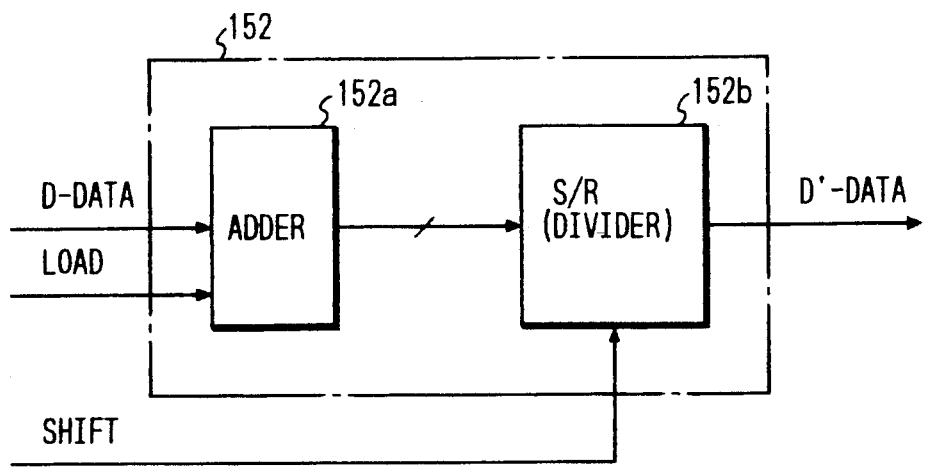
FIG. 4 is a circuitry showing a mean value calculating circuit of the controller in the information processing apparatus.

The mean value calculating circuit 152 comprises an adder circuit 152a and a shift resistor 152b, as shown in FIG. 4. The division calculation in the mean value calculating circuit 152 is carried out according to the inputting of an additional result obtained from the adder circuit 152a into the shift resistor 152b and according to the shift of the data of the shift resistor 152b by giving a shift pulse "SHIFT" from CPU 202 to the shift resistor 152b.

In this embodiment of the present invention, the mean value calculating circuit 152 processes 2×2 dots of the gradation data D-DATA shown in FIG. 6 as one block. With regard to a recent block, the calculating processing about [(63+63+61+61)÷4=62] is carried out in the mean value calculating circuit 152 and it obtains a mean value "62" of four gradation data in the mean value calculating circuit 152.

With regard to a next block, the calculating processing about [(63+60+61+60)÷4=61] is carried out in the mean value calculating circuit 152 and it obtains a mean value "61" in the mean value calculating circuit 152. As stated above, the mean value is obtained in sequence, after the processing for two lines part has been finished the mean value data D'-DATA in the mean value calculating circuit 152 is transmitted in sequence to the dither matrix ROM 153.

The dither matrix ROM 153 stores a matrix data with a form of FIG. 8. The matrix data corresponds to a respective digital data having sixty four (64) stage gradations being inputted (a mean value data of the gradation data). Namely, the dither matrix ROM 153 stores sixty four (64) stage gradations part referring to the value of the above mean value data D'-DATA as an index.

For example, with respect to the mean value "64" of the gradation data the matrix data (a) is stored, with respect to the mean value "63" of the gradation data the matrix data (b) is stored, with respect to the mean value "62" of the gradation data the matrix data (c) is stored, with respect to the mean value "61" of the gradation data the matrix data (d) is stores and with respect to the mean value "60" of the gradation data the matrix data (e) is stored, respectively.

One block shows a matrix of the pixel and a numeral shown in one block indicates a dot size control value (4 bit data) in the respective pixel.

In this embodiment of the present invention, in a case that the mean value data D'-DATA being outputted from the mean value calculating circuit 152 is "62"-"61", as stated above the matrix data being outputted from the dither matrix ROM 153 becomes "16"-"16"-"16" "15" in a first line and becomes "15"-"15"-"15" "15" in a second line, respectively, as shown in FIG. 7. The above matrices are stored in the memory 154 with an illustrated condition shown in FIG. 7.

4 bit size data (a) and 4 bit size data (b), which are the dot size control value at every respective pixel, constitute an odd line dot size data and further 4 bit size data (c) and 4 bit size data (d), which are the dot size control value at every respective pixel, constitute an even line dot size data, respectively.

The dither matrix ROM 153 outputs simultaneously a data about the odd line and a data about the even line with respect to the above gradation data. In a case that the matrix data C-DATA is stored in the memory 154, at first a selector 155 selects the odd line and processes about the 4 bit size data (a) and the 4 bit size data (b), and next the selector 155 selects the even line and processes about the 4 bit size data (c) and the 4 bit size data (d).

As stated above, the matrix data stored in the memory 154, for sake of the printing, is read out in sequence each line direction per one pixel unit in synchronizing with an exposuring scanning through the laser exposuring unit 17 and is outputted as a printing dot size control data C'-DATA.

The controller 100 comprises further a data selection circuit 160 for making effect the character pattern dot data S-DATA or the printing dot size control data C'-DATA. Namely, the data selection circuit 160 makes selectively effect one of the character pattern dot data S-DATA being given from the image information signal generating unit 200 and the printing dot size control data C'-DATA being generated from the gradation converting circuit 150 in accordance with the selection data S/D-SEL being given through the image information signal generating unit 200.

Figure 5:
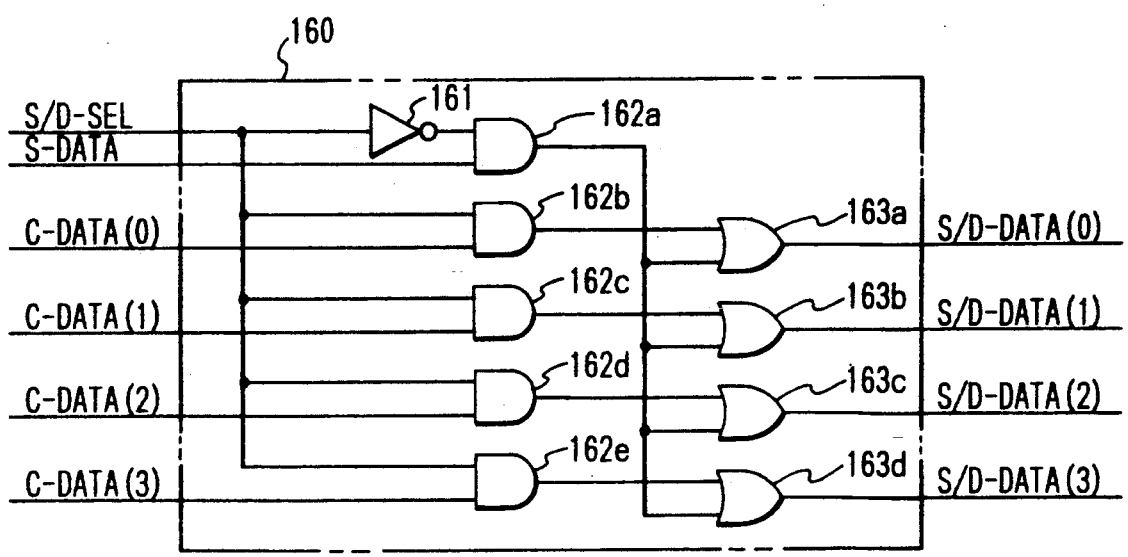
FIG. 5 is a circuitry showing a selection circuit of the controller in the information processing apparatus.

The data selection circuit 160 comprises an inverter 161, five AND elements 162a–162e and four OR elements 163a–163d, as shown in FIG. 5. One of an input terminal of an AND element 162a inputs the character pattern dot data S-DATA being given from the image information signal generating unit 200. Another input terminal of AND element 162a inputs a data which is reversed the selection data S/D-SEL through the inverter 161.

Each of one input terminal of other four AND elements 162b–162e inputs each bit of a 4-bit printing dot size input terminal of other four AND elements 162b–162e inputs commonly the selection data S/D-SEL being given through the image information signal generating unit 200.

Each of one input terminal of four OR elements 163a–163d inputs commonly an output data of AND element 162a.

Each of another input terminal of four OR elements 163a–163d inputs an output data of each AND elements 162b–162e. Each four OR elements 163a–163d outputs a dot printing data S/D-DATA(0)-S/D-DATA(3) from an output terminal thereof.

When the selection data S/D-DATA is a high level, each of the dot printing data S/D-DATA(0)-S/D-DATA(3) follows to each of the printing dot size control data C'-DATA(0)-C'-DATA(3) which is obtained in accordance with the gradation data D-DATA, respectively. The dot size of this case indicates a dot size for representing the density according to the gradation data D-DATA.

Besides, when the selection data S/D-DATA is a low level, each of the dot printing data S/D-DATA(0)-S/D-DATA(3) follows to each of the printing dot size control data C'-DATA(0)-C'-DATA(3) which is obtained in accordance with the character dot data S-DATA, respectively. The dot size of this case indicates a dot size for representing the highest density according to the character dot data S-DATA.

In FIG. 1, each of OR elements 102a-102d is controlled by CPU 101 and controls the effective period of each of the dot printing data S/D-DATA(0)-S/D-DATA(3). Each one of an input terminal of OR elements 102a-102d is connected to the gradation converting circuit 150 and inputs the dot printing data S/D-DATA(0)-S/D-DATA(3), respectively. Each another of an input terminal of OR elements 102a-102d inputs a printing region signal L-ON which is connected to CPU 101.

Four constant current circuits 103a-103d are provided so as to control the current value for driving the laser diode 17a of the laser exposuring unit 17 in accordance with the dot printing data S/D-DATA(0)-S/D-DATA(3).

A power of the laser beam in the laser beam printer outputted from the laser diode 17a is proportional to the size of the current for driving the laser diode 17a of the laser exposuring unit 17. A size of the dot being printed through the exposure of the laser beam in the laser beam printer is proportional to the power of the laser beam.

Each of the constant current circuits 103a-103d is set to have a current value, respectively. The current value of each of the constant current circuits 103a-103d corresponds to the weight of each bit of the dot printing data S/D-DATA(0)-S/D-DATA(3) for inputting so as to supply the driving current to the laser diode 17a of the laser exposuring unit 17. This driving current corresponds to the dot size represented by the dot printing data S/D-DATA(0)-S/D-DATA(3).

The current value of each of the constant current circuits 103a-103d depends on an output of four current setters 104a-104d, respectively. A control value is set respectively in the current setters 104a-104d through CPU 101.

So as to set the respective predetermined control value in each of the current setters 104a-104d, the controller 100 is provided further a laser power detector 105, D/A converting circuit 106, a comparator 107 and a set value input device 108.

The laser power detector 105 detects the power of the laser beam which is outputted from the laser diode 17a. The laser power detector 105 outputs a detection signal MONI. D/A converting circuit 106 generates a reference standard signal REF(A) which corresponds to the control value to be set in each of the constant current circuits 103a-103d. The comparator 107 generates a ready signal U/D in comparison with the detection signal MONI of the laser power detector 105 and the reference standard signal REF(A) of D/A converting circuit 106.

Figure 9:
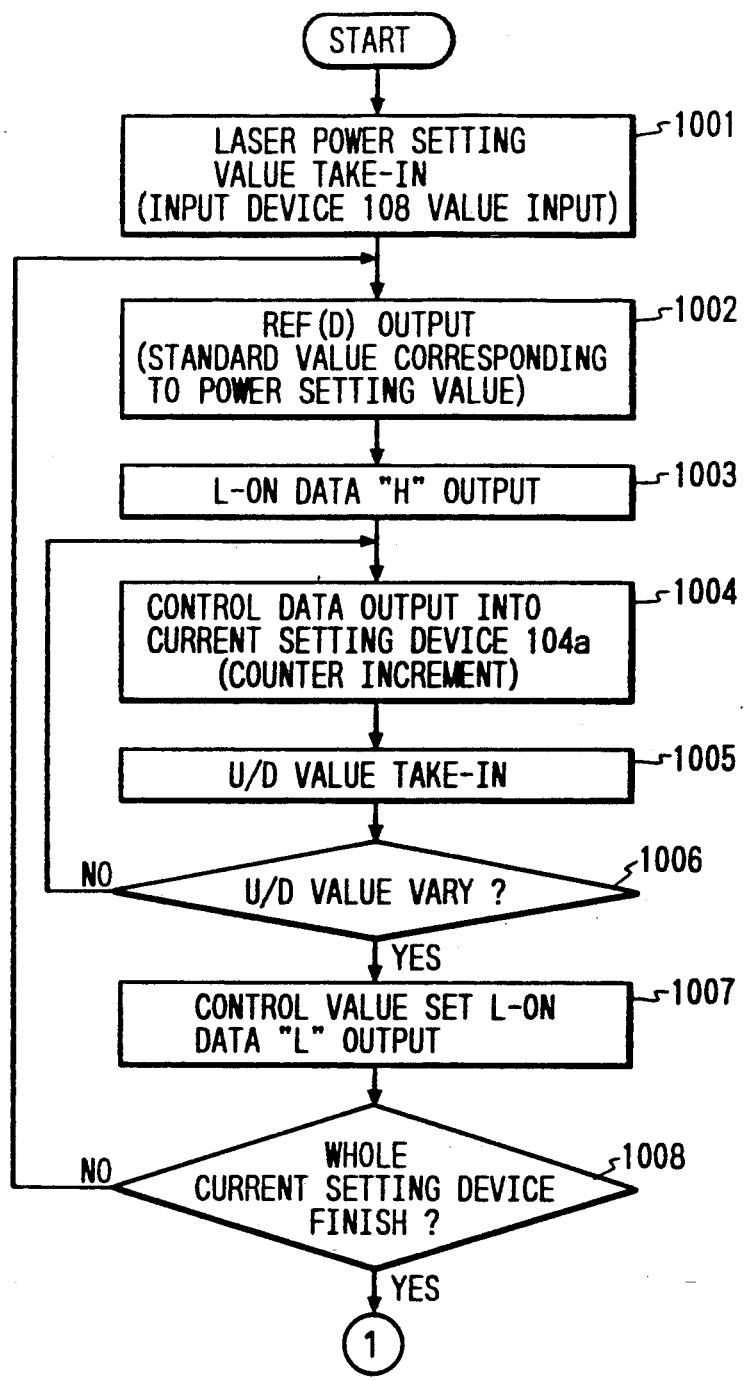
FIG. 9 is a flow chart of an adjustment processing of a laser beam power being carried out by CPU in the controller of the information processing apparatus.

Next, referring to FIG. 9, the adjusting processing for the laser beam power being carried out by CPU 101 will be explained as following.

In the adjusting processing for the laser beam power, first of all, a set value with respect to a predetermined constant current circuit (for example, the constant current circuit 103a) which is inputted by the set value input device 108 is taken-in (a processing step 1001). A reference standard data REF(D) in response to the set value is given into D/A converting circuit 106 (a processing step 1002), and the reference standard signal REF(A) of D/A converting circuit 106 is given in the comparator 107 through D/A converting circuit 106.

Next, the printing region signal L-ON is made a high level (H) (a processing step 1003), after that the control data is outputted to the current setter 104a and the output current of the constant current circuit 103a is made to increase gradually and the laser diode 17a is photo-flashed or the laser beam power is outputted (a processing step 1004).

The laser beam power is detected through the laser power detector 105 and is inputted into the comparator 107 as the detection signal MONI of the laser power detector 105. By comparing the reference standard signal REF(A) of D/A converting circuit 106 and the detection signal MONI of the laser power detector 105, the comparator 107 outputs the ready signal U/D for increasing or decreasing an internal counter value in the current setter 104a.

CPU 101 takes-in the ready signal U/D (a processing step 1005) of the comparator 107 and checks the existence about the variation of the ready signal U/D (a processing step 1006) of the comparator 107.

The period in which the reference standard signal REF(A) of D/A converting circuit 106 is larger than the detection signal MONI of the laser power detector 105, it is controlled to increase the counting value of the counter of the current setter 104a. When the reference standard signal REF(A) of D/A converting circuit 106 becomes equal or becomes smaller than the detection signal MONI of the laser power detector 105, the increment operation for increasing the counting value of the counter of the current setter 104a is finished and the counting value of the counter is set to be a control value in the current setter 104a and the printing region signal L-ON is made a low level (L) (a processing step 1007).

After the conformation in which the above stated processing has been finished with respect to all current setters 104a-104d, thereby the setting processing is finished (a processing step 1008).

By employing the laser beam printer having been adjusted in accordance to the above stated setting processing, one example for printing comprising the image of a picture region A and the image of a character region B will be explained referring to FIG. 10.

Figure 10:
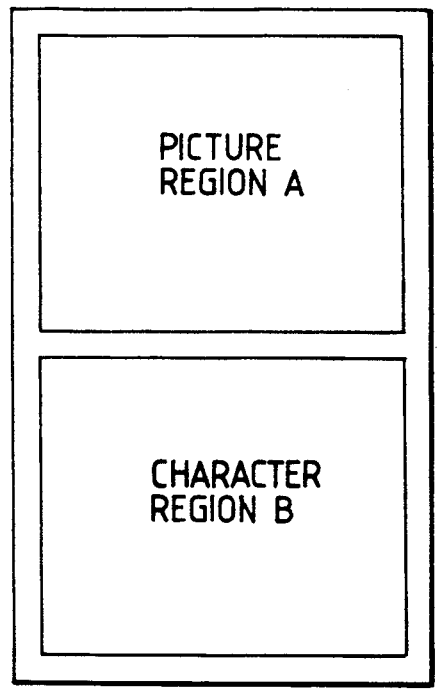
FIG. 10 shows an example of an image printing having a picture region A and a character region B.

The image data for printing the image having the picture region A and the character region B shown in FIG. 10 is generated through the image information signal generating unit 200. In the picture region A of the printing image, by reading the picture through the image scanner 205 gradation data is generated and this gradation data is printed by the laser beam printer.

Besides, in the character region B of the printing image, a character pattern dot data is generated through CG-ROM 207 according to the character code being inputted from the keyboard 203 and the character pattern dot data is printed by the laser beam printer.

In this example, both the picture region A of the printing image and the character region B of the printing image exist within one same page, however even when the picture region A of the printing image or the character region B of the printing image exist respectively in the different pages or the different documents, it can deal with similar to the above stated example.

In the picture region A of the printing image the printing control is carried out taking serious views of the gradation reproduction characteristic and the picture quality, besides in the character region B of the printing image the printing control is carried out taking a serious view of the contrast.

For the above stated printing control in the laser beam printer, first of all, the image information signal generating unit 200 outputs a printing command. Next, the image information signal generating unit 200 generates the gradation data D-DATA in response to the request of the image data from the laser beam printer and the picture region A of the printing image is printed by putting the selection data S/D-DATA at the high level.

At this time, in the laser beam printer, under the control of CPU 101 the gradation converting circuit 150 is made to function and outputs the gradation data D-DATA by converting the printing dot size data C'-DATA. The data selection circuit 160 selects the printing dot size data C'-DATA and further generates the dot printing data S/D-DATA(0)-S/D-DATA(3).

Accordingly, the laser diode 17a of the laser exposuring unit 17 is driven with the current in which the size of the dot matrix has formed with a dot size in respond to the density shown in the gradation data D-DATA. This dot matrix having the predetermined dot size is printed by the laser beam printer.

Next, the image information signal generating unit 200 generates the character pattern dot data S-DATA and is made to print the character region B of the printing image by putting the selection data S/D-DATA at the low level.

At this time, in the laser beam printer, the data selection circuit 160 selects the character pattern dot data S-DATA and generates the dot printing data S/D-DATA(0)-S/D-DATA(3).

Accordingly, the laser diode 17a of the laser exposuring unit 17 is driven with the current in which the size of the dot has formed with a dot size (the character pattern dot) representing the maximum density. This dot having the maximum density is printed by the laser beam printer.

Next, during the printing of the gradation data D-DATA the data processing control for controlling the gradation converting circuit 150 will be explained referring to FIG. 11. The above data processing control is carried through CPU 101.

When the printing command is received through the image information signal generating unit 200 (a processing step 2001), the image data to be printed (in this case, the gradation data D-DATA) is requested (a processing step 2002) and the gradation data D-DATA being set from the image information signal generating unit 200 is stored in the memory 151 (a processing step 2003).

Next, the gradation data D-DATA is read out with 4 pixels part from the memory 151 and the gradation data D-DATA is given to the mean value calculating circuit 152. In the mean value calculating circuit 152, the addition calculation for the gradation data D-DATA is carried out (a processing step 2004) and also the division calculation for the gradation data D-DATA is carried out (a processing step 2005), respectively. Accordingly, the control processing for obtaining the mean value data D'-DATA is carried out.

When the mean value data D'-DATA is given to the dither matrix ROM 153, the matrix data C-DATA is outputted from the dither matrix ROM 153. At first, the matrix data C-DATA of the odd line part is selected by the selector 155 (a processing step 2006) and this matrix data C-DATA of the odd line part is stored in the memory 154 (a processing step 2007).

Next, the matrix data C-DATA of the even line part is selected by the selector 155 (a processing step 2008) and this matrix data C-DATA of the even line part is stored in the memory 154 (a processing step 2009). The above stated processing is continued repeatedly as long as the image data to be printed exists (a processing step 2010).

When the development in the matrix data C-DATA is finished, the matrix data C-DATA is read out in turn. This matrix data C-DATA is given to the constant current circuit 103a–103d and drives the laser diode 17a of the laser exposuring unit 17 (a processing step 2011).

In the above stated embodiment according to the present invention, so as to vary the size of the printing dot, the power of the laser beam in the laser beam printer is varied according to the variation of the dimension of the driving current in the laser diode 17a of the laser exposuring unit 17. However, the dimension of the driving current in the laser diode 17a of the laser exposuring unit 17 is made constant and it may employ the pulse width modulation (PWM) control. Further, it may employ the combined control comprising of the laser beam power control and the PWM control.

Further, in the above stated embodiment according to the present invention, since each of the current set value in the constant current circuits 103a–103d is set independently respectively, thereby γ correction curve for reproducing the gradation characteristic and the adjustment of the fluctuation in the laser beam power caused by the change in aging and the change in temperature can be practised easily.

We claim:

1. In a printing apparatus in which a dot printing element is controlled in accordance with an image information signal transmitted from an image information signal generating unit and a visual image expressed by dots is formed, said dot printing element is controlled through a main control unit, said main control unit comprises a first control means, said first control means of the main control unit controls said dot printing element so as to print a dot having a predetermined dot size in accordance with an existence of a dot signal in said image information signal, the printing apparatus characterized in that, said main control unit includes further a second control means and a control selection means;

said second control means of said main control unit controls said dot printing element so as to vary a size of the dot of a dither dot matrix which is expressed in accordance with a gradation signal of said image information signal; and said control selection means of said main control unit operates selectively said first control means of said main control unit and said second control means of said main control unit.

2. In a printing apparatus in which a dot printing element is controlled in accordance with an image information signal transmitted from an image information signal generating unit and a visual image expressed by dots is formed, said dot printing element is controlled through a main control unit, said main control unit comprises a first control means, said first control means of said main control unit controls said dot printing element so as to print a dot having a predetermined dot size in accordance with an existence of a dot signal in said image information signal, the printing apparatus characterized in that, said main control unit includes further a second control means and a control selection means;

said second control means of said control unit controls said dot printing element so as to print the dot in accordance with a gradation signal of said image information signal; and said control selection means of said main control unit operates selectively said first control means of said main control unit and said second control means of said main control unit.

3. In a printing apparatus in which a dot printing element is controlled in accordance with an image information signal transmitted from an image information signal generating unit and a visual image expressed by dots is formed, said dot printing element is controlled through a main control unit, said main control unit comprises a first control means, said first control means of said main control unit controls said dot printing element so as to print a dot having a predetermined dot size in accordance with an existence of a dot signal in said image information signal, the printing apparatus characterized in that, said main control unit includes further a second control means, a control selection means and a data identifying signal generating means;

said second control means of said main control unit controls said dot printing element so as to vary a size of the dot of a dither dot matrix which is expressed in accordance with a gradation signal of said image information signal; and said control selection means of said main control unit operates selectively said first control means of said main control unit and said second control means of said main control unit in accordance with an identifying signal through said data identifying signal generating means of said main control unit.

4. A printing apparatus according to claim 2, characterized in that, said main control unit includes further a data identifying signal generating means, said control selection means of said main control unit selects said first control means of said main control unit and said second control means of said main control unit in accordance with a data identifying signal in said data identifying signal generating means of said main control unit.

5. A printing apparatus according to claim 4, characterized in that, said image information signal generating unit comprises a central processing unit for carrying out a data processing and a control processing, a keyboard for giving a control function and a character data, an image scanner for generating a gradation data by reading out a picture under a control of said central processing unit and for storing said gradation data in a first memory means, and a second memory means for storing a character pattern dot data by converting a character code from said keyboard in a predetermined position of a third memory means.

6. A printing apparatus according to claim 5, characterized in that, said image scanner reads out a density of the picture in a predetermined gradation and outputs said gradation data in sequence and stores said gradation data in sequence.

7. A printing apparatus according to claim 5, characterized in that, said central processing unit receives a selection data, and said selection data indicates an effective image data to be printed in a case one of said gradation data and said character pattern dot data is generated by reading out from the data stored in said first memory means and said third memory means.

8. A printing apparatus according to claim 7, characterized in that, said selection data identifies a gradation data of said image outputted through said image information signal generating unit and a character dot data of said image outputted through said image information signal generating unit.

9. A printing apparatus according to claim 5, characterized in that, said main control unit comprises a gradation converting circuit for converting said gradation data to a modulating data, and said gradation converting circuit comprises a memory means for storing said gradation data transmitted from image information signal generating unit.

10. A printing apparatus according to claim 9, characterized in that, said memory means of said gradation converting circuit stores said gradation data and transfers said gradation data to a mean value calculating circuit.

11. A printing apparatus according to claim 10, characterized in that, a mean value of said gradation data is transmitted to a dither matrix, and said dither matrix stores a matrix data corresponding to a digital data of said gradation data.

12. In an information processing apparatus using a printing apparatus comprising an image information signal generating unit having an image read out means for generating a gradation information signal and a character pattern information generating means for generating a character pattern information signal, and the printing apparatus in which a dot printing element is controlled in accordance with an image information signal transmitted from said image information signal generating unit and a visual image expressed by dots is formed, said image information signal generating unit includes a transmitting means for transmitting said gradation information signal and the character pattern information signal, and the printing apparatus includes a main control unit for controlling the dot printing element, said first control means of said main control unit controls said dot printing element so as to print a dot having a predetermined dot size in accordance with an existence of a dot signal in said image information signal, the information processing apparatus characterized in that, said main control unit of the printing apparatus includes further a second control means, a control selection means, and a data identifying signal generating means;

said second control means of said main control unit in the printing apparatus controls said dot printing element so as to vary a size of the dot of a dither dot matrix which is expressed in accordance with a gradation signal of said image information signal;

said control selection means of said main control unit in the printing apparatus operates selectively said first control means of said main control unit and said second control means of said main control unit in accordance with an identifying signal through said data identifying signal generating means of said main control unit.

13. An information processing apparatus using a printing apparatus according to claim 12, characterized in that, said image information signal generating unit comprises a central processing unit for carrying out a data processing and a control processing, a keyboard for giving a control function and a character data, an image scanner for generating a gradation data by reading out a picture under a control of said central processing unit and for storing said gradation data in a first memory means, and a second memory means for storing a character pattern dot data by converting a character code from said keyboard in a predetermined position of a third memory means.

14. An information processing apparatus using a printing apparatus according to claim 13, characterized in that, said image scanner reads out a density of the picture in a predetermined gradation and outputs aid gradation data in sequence and stores said gradation data in sequence.

15. An information processing apparatus using a printing apparatus according to claim 12, characterized in that, said central processing unit receives a selection data, and said selection data indicates an effective image data to be printed in a case one of said gradation data and said character pattern dot data is generated by reading out from the data stored in said first memory means and said third memory means.

16. An information processing apparatus using a printing apparatus according to claim 15, characterized in that, said selection data identifies a gradation data of said image outputted through said image information signal generating unit and a character dot data of said image outputted through said image information signal generating unit.

17. An information processing apparatus using a printing apparatus according to claim 12, characterized in that, said main control unit comprises a gradation converting circuit for converting said gradation data to a modulating data, and said gradation converting circuit comprises a memory means for storing said gradation data transmitted from image information signal generating unit.

18. An information processing apparatus using a printing apparatus according to claim 17, characterized in that, said memory means of said gradation converting circuit stores said gradation data and transfers said gradation data to a mean value calculating circuit.

19. An information processing apparatus using a printing apparatus according to claim 18, characterized in that, a mean value of said gradation data is transmitted to a dither matrix, and said dither matrix stores a matrix data corresponding to a digital data of said gradation data.

* * * * *